United States Patent [19]

Woltron

[11] Patent Number: 4,688,778
[45] Date of Patent: Aug. 25, 1987

[54] PLASTIC LEAF SPRING

[75] Inventor: Herbert Woltron, Eisenstadt, Austria

[73] Assignee: Isosport Verbundbauteile Ges.m.b.H., Eisenstadt, Austria

[21] Appl. No.: 537,270

[22] Filed: Sep. 29, 1983

[30] Foreign Application Priority Data

Oct. 1, 1982 [AT] Austria .................................. 3633/82
Apr. 14, 1983 [AT] Austria .................................. 1327/83

[51] Int. Cl.⁴ ............................................. F16F 1/36
[52] U.S. Cl. ...................................... 267/148; 267/47
[58] Field of Search ............... 267/148, 141.1, 149, 267/151, 152, 158, 47, 48; 65/2; 264/263, 157, 258, 270; 428/265, 267, 280

[56] References Cited

U.S. PATENT DOCUMENTS

| | | | |
|---|---|---|---|
| 2,852,424 | 9/1958 | Reinhart et al. | 267/149 X |
| 3,968,958 | 7/1976 | Huchette et al. | 267/149 X |
| 3,973,596 | 8/1976 | Walker | 264/270 X |
| 4,065,340 | 12/1977 | Dickerson | 264/157 X |
| 4,278,726 | 7/1981 | Wieme | 267/141.1 X |
| 4,356,227 | 10/1982 | Stenzenberger | 428/267 X |
| 4,405,341 | 9/1983 | Jaschek et al. | 428/265 X |
| 4,464,432 | 8/1984 | Dost et al. | 428/280 |

FOREIGN PATENT DOCUMENTS 2021731 12/1979 United Kingdom ................ 267/149

Primary Examiner—Duane A. Reger
Attorney, Agent, or Firm—Bierman & Muserlian

[57] ABSTRACT

A plastic leaf spring for motor vehicles comprising a plurality of cured durometic plastic strips reinforced with high strength fibers aligned substantially in the direction of the maximum elongation or compression of the fibers occurring under spring load at least in essential resilient regions of the spring, the resilient regions being the strips bonded together by an adhesive and eventually also being bonded to another element and a process for its preparation.

10 Claims, 6 Drawing Figures

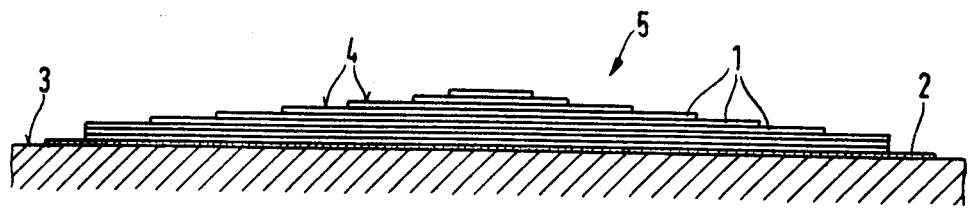
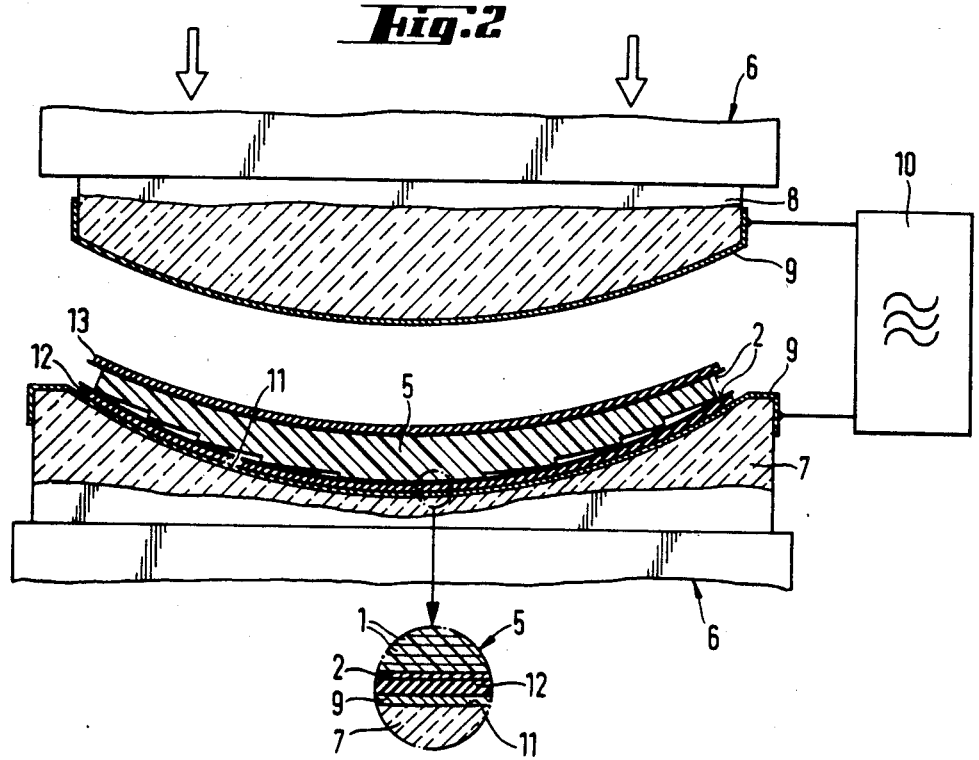

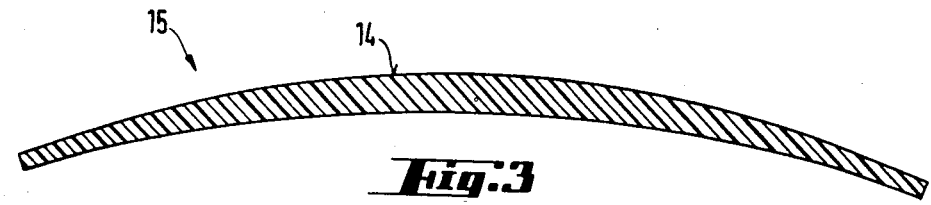
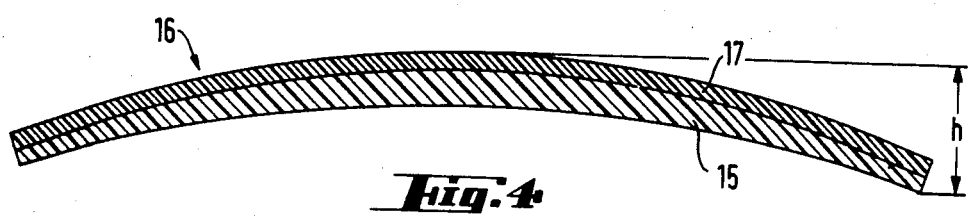
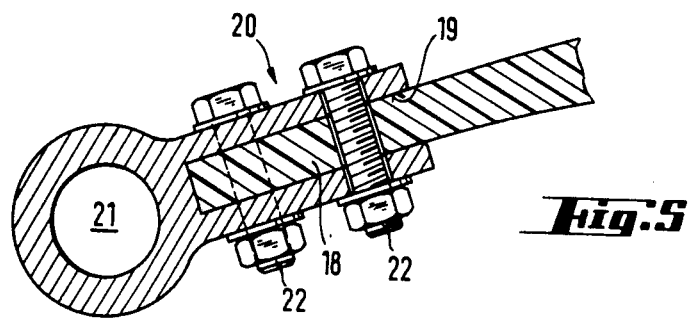
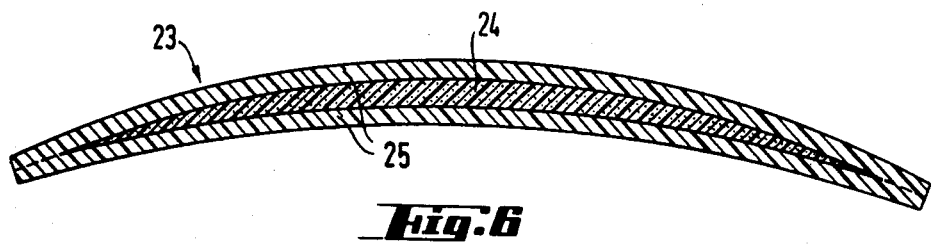

PLASTIC LEAF SPRING

STATE OF THE ART

Plastic springs have been known for many years but have not been accepted by the motor vehicle industry. For example, U.S. Pat. No. 3,900,357 describes a method for the production of glass fiber-resin springs made from a foil of a non-woven glass fiber material and an curable matrix of epoxy resin. Strips of the foil are stacked in several layers in a mold which are then heated at elevated temperatures under pressure to cure the matrix resin and form the finished leaf spring. Due to the fact that the foil layers are only approximately 0.01 inches thick, 67 layers of foil are needed to obtain a spring with a thickness of three quarters of an inch and the hardening time required for such a spring is on the order of 45 minutes. The insertion of this many foil layers requires too much labor to be economical and the prolonged curing times are also too expensive.

OBJECTS OF THE INVENTION

It is an object of the invention to provide a novel plastic leaf spring containing a higher volume of reinforcement fibers than was possible with known plastic leaf springs.

It is another object of the invention to provide an improved process for the preparation of plastic leaf springs with less manual labor and shorter manufacting times.

These and other objects and advantages of the invention will become obvious from the following detailed description.

THE INVENTION

The novel plastic leaf spring of the invention for motor vehicles is comprised of a plurality of cured duromeric plastic strips reinforced with high strength fibers aligned substantially in the direction of the maximum elongation or compression of the fibers occurring under spring load at least in essential resilient regions of the spring, the said resilient regions being said strips bonded together by an adhesive and eventually also being bonded to another element.

The process of the invention for the preparation of the plastic leaf spring comprises continuously impregnating a fiber roving or ribbon-like type fiber fabric with a curable duromeric resin mixture to form an endless wet strip, optionally subjecting the latter to stress, curing the resin strip at elevated temperatures, optionally roughing at least one surface of the resulting cured strip, cutting the strip to size, forming a laminate out of a series of cured strips cut to the spring shape with a thermosetting bonding adhesive between the strips, press molding the laminate with heating while curing the adhesive to form a resilient composite element and eventually bonding the element to a more resilient laminate of said strips and/or to another element to form the leaf spring or leaf spring profile body.

The reinforcing fibers are preferably glass fibers and the resin-hardener mixture is preferably an epoxy resin based on Bisphenol A and an amine hardener such as e.g. a cycloaliphatic diamine. Since the strip is under tensile strength when cured, a mechanical pre-stress of the reinforcement fibers extending lengthwise of the strip results in the fully cured strips. The resin content of the strips is from 20% to 30%, preferably about 25%, by weight corresponding to 35% to 48%, preferably about 41%, by volume. The cured strips have advantageously a thickness of at least 0.4 mm, preferably at least 0.8 mm.

The starting unidirectional reinforced roving type strips have a thickness of 0.5 to 1.0 mm, preferably about 1.0 mm and the fiber fabric reinforced strips may have a thickness of 0.25 to 0.6 mm, preferably about 0.4 mm, the latter serving to give a sufficient transverse strength to the final plastic leaf spring. The resulting cured strips may be in the form of an endless strip wound onto rolls and is drawn from the rolls as needed and cut to the desired length into strips.

Referring now to the drawings:

FIG. 1 is a cross-sectional view of a laminate structure of the invention ready for formation of a resilient component of the spring of the invention.

FIG. 2 is a cross-sectional view of a heatable press with the structure of FIG. 1 ready for pressing.

FIG. 3 is a cross-sectional view of the pressed resilient laminate component after grinding and FIG. 4 is a cross-sectional view of a finished leaf spring containing the component of FIG. 3.

FIG. 5 is a plan view of a spring eye to be mounted at the ends of the plastic leaf spring.

FIG. 6 is a cross-sectional view of a plastic leaf spring of the invention with an elastic rubber core.

In FIG. 1, the cured of a width of 195 mm strips 1 have been passed through an adhesive applicator to provide each side with an adhesive of 80 g/m$^2$ of solids which is a resin-hardener mixture of the same composition as used to prepare the strips and are stacked on a flat base 3 provided with a separation layer 2. In the example of FIG. 1, there are 4 roving type strips, one fiber type fabric strip and then four roving type strips with a length of 1550 mm topped with 19 strips in lengths decreasing from 1200 mm to 200 mm with a fiber fabric type strip followed by 6 or 7 roving type strips. The thus stacked cured strips form a laminate structure 5 with a stepped profile 4 which can be handled as a unit.

The resulting structure 5 is placed in the press mold 6 of FIG. 2 provided with a high frequency heating generator 10 operating with a frequency of 27.12 MHz, for instance connected to mold halves 7 and 8 provided with electrically conducting coverings 9. Before the pressing operation, concave press surface 11 of lower mold half 7 is covered with a pressure compensating mat 12 made of soft elastic material and a separation foil contigous thereto. The structure 5 is placed with its stepped profile 4 down on the mat 12 after which the structure 5 deforms as a whole and adheres to the separation foil due to its high degree of flexibility as shown in FIG. 2.

The mold is then closed by lowering the upper mold half 8 and the hot pressing operation is effected at a pressure of about 40N/cm$^2$ with the high frequency (HF) generator 10 turned on. In the electromagnetic HF field, both the material of the cured strips 1 and the adhesive layers absorb dissipated HF energy, whereby the structure 5 is heated quickly and uniformly to cure the adhesive only. After the pressed material has reached a temperature of 140° C., the HF energy supply is stopped or throttled to the extent that this temperature is essentially maintained during the remaining pressing time. An important advantage here is that, because of the relatively small percentage of uncured, that is, still reactive, resins in the total resin mass of the pressed material—which percentage is limited to the adhesive, local temperature increases which are difficult to control and would be unevitable due to the actually exothermic curing reaction if the strips were not previously cured, need not be feared.

During the pressing operation, the adhesive in the joints of the structure 5 becomes relatively fluid at the pressing temperature of 140° C., so that it flows well under the action of the pressing pressure applied and any excess adhesive is squeezed laterally out of the joints and with it any air inclusions existing inside the joints are removed. The adhesive which fills the joints completely and uniformly, subsequently cures quickly whereby the structure 5 is transformed into a resilient composite element. At the end of the pressing period which in this example is 5 minutes, the mold is opened and the composite part removed while still hot and it is allowed to cool, and then is ground on its stepped side caused by the varying length laminate strips 1 for the formation of a smooth surface 14 having an arcuate contour. The composite part 15 then has approximately the form as shown in FIG. 3.

To process the resilient composite part 15 thus produced into a leaf spring profile body, part 15 which had just been ground smooth is bonded on its convex surface 14 in to a second element which had just been ground smooth in a second process step to several stacked strips 1 in which four roving type strips, one fiber fabric type strip and four additional roving type strips with a width of 195 mm and a length of 1560 mm which as in the production of the first structure 5, have been provided on both sides with an adhesive agent application of 80 g/m$^2$ (solid substance), layered one over the other to produce a second structure on the flat support 3 provided with the separation layer 2.

This second structure is then, as described in connection with FIG. 2, inserted on the concave pressing surface covered with a pressure-compensating mat and a separation foil of the lower mold half of a HF energy-heated press. The composite part 15, which had been coated on its convex surface 14 with adhesive also, is now placed with its surface 14 down onto the second laminate structure already introduced in the press, the composite part surface fitting snugly on the second structure. After a separation foil and another pressure-compensating mat have been placed on top, the mold is closed, and by HF heating of the pressured material to 140° C. at a pressing pressure of 40N/cm$^2$ for a pressing time of 5 minutes to cure the adhesive, the individual pressed material components are bonded together to form a leaf spring section.

The mold is then opened and the finished leaf spring profile body 16 shown in FIG. 4, consisting of the resilient composite part 15 and a second resilient composite region 17, is taken out while still hot. After cooling, the leaf spring profile body is divided by saw cuts into three identical leaf springs ready for use, each 60 mm wide.

The leaf spring has a center thickness of 34 mm and a thickness of 17 mm at its ends. The height of the spring center over the spring ends is 130 mm. It has a spring constant of 60N/mm and is rated for a maximum deflection in the center of 200 mm. The said leaf spring in endurance load alternation test withstood more than double the number of load cycles at which a similar steel leaf spring became defective in comparison tests. The said leaf spring produced by the two-step process has the advantage that the edge regions at its top and bottom sides which are under increased stress when the spring is loaded are formed by strips which extend with continuous fibers of the glass fiber reinforcement over the entire spring length.

Should it be desirable in the above described process to shorten the pressing times in the HF-heated press, then as a modification of the above described process the resilient composite part or the leaf spring section can be taken out of the mold already after partial curing of the adhesive agent and only then completely curing the adhesive in a furnace at elevated temperature.

According to a further variation of the production of leaf springs, instead of applying the adhesive with an adhesive applicator, an adhesive sheet activatable at elevated temperature is inserted between two adjacent components which may advantageously be a glass fiber fabric impregnated with an epoxy resin-hardener mixture and dried (glass fiber prepreg). The bonding is then effected preferably as described with reference to FIG. 2 in a press with HF capacitor field heating of the pressed material. However, because of the inhibition of free flow of bonding agent in the adhesive joint, the temperatures required for the bonding will generally be higher when such adhesive sheets are used than with the use of adhesive agent layers applied on the strips such as with an adhesive applicator. When adhesive sheets containing such a glass fiber fabric are used, the spring body may in many cases be composed exclusively of glass fiber roving type strips because the glass fiber fabric reinforcement in the adhesive joints usually already produces a sufficient transverse tensile strength of the spring body.

The introduction of force at the spring ends takes place in the described leaf springs of the invention by spring eyes. In an advantageous design illustrated in FIG. 5, the spring end 18 is fastened in a slot 19 of extension 20 of a spring eye 21 by screws 22 which pass through corresponding bores in the spring end 18 as well as by gluing.

In the leaf springs of the invention, mainly only the strips arranged in the upper and lower edge regions of the spring contribute to the attainable spring force. Besides, shearing stresses to be absorbed by the adhesive joints are always greatest in the center of a spring cross-section and these facts are taken into account in a further advantageous design of the leaf spring of the invention, where in the center of the leaf spring a core made of a fiber-reinforced elastomeric resin is disposed which is bonded at its top and bottom sides to a laminate packet, which packets form resilient composite regions 25. FIG. 6 shows such a leaf spring 23 in schematic representation wherein such a core 24 made of plastic which is usually produced in a separate step, is coated on both sides with adhesive, and then, contiguously to its top and bottom sides, joined to a structure consisting of several strips of equal length—analogously as described in connection with FIG. 2, bonded in a heated press to form a leaf spring 23 or leaf spring profile body. It should be noted here that the core 24, terminating in wedge form at its two ends, should not extend up to the ends of the leaf spring 23. Because of the rubber-elastic deformability of the core material, no appreciable shearing stresses can build up in core 24 upon deformation of the leaf spring 23 under load.

Various modifications of the springs and the process of the invention may be made without departing from the spirit or scope thereof and it should be understood that the invention is intended to be limited only as defined in the appended claims.

What I claim is:

1. A plastic leaf spring for vehicles comprising a plurality of more than three cured duromeric plastic ribbon-like strips reinforced with high strength fibers aligned substantially in the direction of the maximum elongation or compression of the strips occurring under spring load at least in essential resilient regions of the spring, wherein the said resilient regions being said strips of at least 0.8 mm thickness bonded together via layers of adhesive, said resilient regions eventually also being bonded via layers of adhesive to another element.

2. A plastic leaf spring of oblong shape with a viable longitudinal thickness for vehicles comprising a plurality of more than three cured duromeric plastic ribbon-like strips reinforced with high strength fibers aligned substantially in the direction of maximum elongation or compression of the strips occurring under spring load in the resilient regions of the spring, wherein a sole resilient region is formed by said strips of at least 0.8 mm thickness bonded together via layers of adhesive, whereby in said sole resilient region the outermost strips extend over the entire length of this resilient region and others of said strips have different lengths and are shorter than the said sole resilient region.

3. A leaf spring of claim 1 having two resilient regions bonded on either side of a core made of an elastomeric resin and of fibrous material embedded in this resin.

4. A leaf spring of claim 1 wherein the majority of the strips have the reinforcement fibers extending exclusively lengthwise of the leaf spring.

5. The spring of claim 4 wherein the strips are prestressed.

6. A leaf spring of claim 1 wherein a minority of strips have reinforcement fibers whose axes include an angle of 5° to 90° with respect to the lengthwise direction of the spring.

7. The spring of claim 6 wherein the angle is 90° C.

8. The spring of claim 1 wherein the adhesive is a duromeric resin.

9. The spring of claim 1 wherein the fibers are in the form of a fiber fabric.

10. The spring of claim 1 wherein the adhesive is based on the same curable duromeric plastic as used in the strips.

* * * * *